US009928447B2

(12) United States Patent
Koren et al.

(10) Patent No.: US 9,928,447 B2
(45) Date of Patent: Mar. 27, 2018

(54) SOCIAL CIRCLE AND RELATIONSHIP IDENTIFICATION (71) Applicant: Intel Corporation, Santa Clara, CA (US)

(72) Inventors: Oded Koren, Gani Tikva (IL); Shahar Taite, Kfar Saba (IL); Yaniv Golan, Haifa (IL); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/025,767

(22) PCT Filed: Dec. 20, 2013

(86) PCT No.: PCT/US2013/077223
§ 371 (c)(1),
(2) Date: Mar. 29, 2016

(87) PCT Pub. No.: WO2015/094370
PCT Pub. Date: Jun. 25, 2015

(65) Prior Publication Data
US 2016/0224871 A1 Aug. 4, 2016

(51) Int. Cl.
G06K 9/00 (2006.01)
G06K 9/62 (2006.01)
(Continued)

(52) U.S. Cl.
CPC ....... *G06K 9/6284* (2013.01); *G06K 9/00288* (2013.01); *G06K 9/18* (2013.01); *G06K 9/3258* (2013.01); *G06Q 50/01* (2013.01)

(58) Field of Classification Search
USPC ........................................................ 382/118
See application file for complete search history.

(56) References Cited

U.S. PATENT DOCUMENTS

2005/0147292 A1* 7/2005 Huang ............... G06K 9/00228
382/159
2006/0251292 A1 11/2006 Gokturk et al.
(Continued)

FOREIGN PATENT DOCUMENTS

CN 106796709 A 5/2017
KR 1020090100737 A 9/2009
WO WO-2015094370 A1 6/2015

OTHER PUBLICATIONS

"International Application Serial No. PCT/US2013/077223, International Search Report dated Sep. 22, 2014", 4 pgs.
(Continued)

Primary Examiner — Jerome Grant, II
(74) Attorney, Agent, or Firm — Schwegman Lundberg & Woessner, P.A.

(57) ABSTRACT

The examiner has taken the exact language in WO 2015/094370 A1 to transcribe it: Systems, apparatus, and methods to determine relationships, group memberships, and social networks and circles automatically through an analysis of media content, such as photos or videos, and ascertaining the connections between individuals or groups. Embodiments include identifying individuals in photos with or without other people in different situations, and developing a context based on objects in the photo. The extracted context may be stored in a predefined ontology structure in a database and analyzed to determine relationships or group memberships. A database of automatically determined relationships may be analyzed in order to provide relationship recommendations, social advice, or to support law enforcement investigations. The database may be continuously updated with additional information provided by individuals or obtained through a secondary social network that includes user media or social information.

23 Claims, 6 Drawing Sheets (51) Int. Cl.
*G06Q 50/00* (2012.01)
*G06K 9/18* (2006.01)
*G06K 9/32* (2006.01)

(56) References Cited

U.S. PATENT DOCUMENTS

| | | | |
|---|---|---|---|
| 2010/0086213 A1* | 4/2010 | Momoi | G06K 9/00362 |
| | | | 382/195 |
| 2011/0038512 A1 | 2/2011 | Petrou et al. | |
| 2011/0119593 A1* | 5/2011 | Jacobson | G06Q 30/02 |
| | | | 715/736 |
| 2012/0158935 A1 | 6/2012 | Kishimoto et al. | |
| 2013/0194438 A1 | 8/2013 | Sweet, III et al. | |
| 2015/0063640 A1* | 3/2015 | Anabuki | G06T 7/20 |
| | | | 382/103 |
| 2016/0371536 A1* | 12/2016 | Yamaji | G06F 17/30247 |
| 2016/0379393 A1* | 12/2016 | Baumgartner | G06F 17/30247 |
| | | | 382/165 |
| 2017/0083760 A1* | 3/2017 | Kiyota | E02F 9/26 |
| 2017/0111592 A1* | 4/2017 | Yamamoto | H04N 5/265 |

OTHER PUBLICATIONS

"International Application Serial No. PCT/US2013/077223, Written Opinion dated Sep. 22, 2014", 7 pgs.
Gallagher, Andrew C, et al., "Using Context to Recognize People in Consumer Images", [online]. Retrieved from the Internet: <URL: http://chenlab.ece.cornell.edu/people/Andy/publications/Andy_files/cva1042.pdf>, (2009), 22 pgs, Dec. 2009.
"International Application Serial No. PCT/US2013/077223, International Preliminary Report on Patentability dated Jun. 30, 2016", 9 pgs.

* cited by examiner

SOCIAL CIRCLE AND RELATIONSHIP IDENTIFICATION

CROSS-REFERENCE TO RELATED APPLICATION

This application is a U.S. National Stage Filing under 35 U.S.C. 371 from International Application No. PCT/US2013/077223, filed on Dec. 20, 2013, and published as WO 2015/094370 on Jun. 25, 2015, which application is incorporated herein by reference in its entirety.

BACKGROUND

Consuming data in a social context and creating social circles or on-line social networks has become very popular, and a desire to share these experiences has dramatically increased. This desire has created new connection-challenges for individuals, such as whom an individual knows in what circumstances, who to connect with, how to associate people to specific social circles, and the context of those connections and circles.

Various systems provide for manual grouping of people into social circles based on user created categories, such as friends, family, co-workers, and the like, or ascription to different groups (e.g. a soccer team or club). Manual grouping is done by prompting the user to identify individuals and assign them to groups or social circles. For example, a FACEBOOK™ user may be asked if he or she knows an individual, works for a specific organization, or studied at a particular educational institution. The user may then manually identify or group individuals into social circles or other categories.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

While existing social grouping techniques have advantages and disadvantages, they do not automate or complete the social context. Techniques discussed herein include utilizing image processing and analysis capabilities to provide automated social circle generation and analysis for a variety of applications. In an example, an analysis of an individual's personal info entered into a system or through facial recognition techniques may provide the ability to cross reference a variety of data sources to generate a social relationship and context for the relationship. This information may be useful for different applications such as social networks, security privileges control, and personal assistants.

In an example, social networks and circles may be formed automatically by scanning a user's media content (e.g., photos or videos stored on a mobile device, a personal computer, or an on-line repository) and ascertaining the connections between the user and individuals or groups by identifying photos with other people in different situations (e.g., family members, relatives, sorority sisters, army friends, teammates, colleagues at work, etc.). In an example scenario, a user may have many pictures of himself with other people wearing similar soccer uniforms at a soccer school. An example social relationship identification system may determine that the people in the pictures are the user's soccer buddies and group them together into a social circle with a label that includes the term "soccer."

An example social relationship identification system may be utilized to control security privileges, such as access to wired or wireless networks, storage, or other devices. Access to resources may be determined according to relationship connections identified by the system through the use of social or relationship analysis techniques. For example, if a sister of an individual enters the individual's house, a camera may capture an image of her that a security system may utilize to identify her, and based on the individual's relationship, which may have been established though the processing of other images by the relationship identification system, the security system may allow her to connect to the user's home wired or wireless network, or access other resources in the home.

An example social relationship identification system may be utilized as a social advisor. For example, by determining and understanding (e.g., ranking or mapping) an individual's relationships or social connections with others, the system may provide advice on the individual's relationship status with others, or recommend an activity with them, through one or more personal assistance applications. For example, a personal assistance application may prioritize reminders based on the individual's relationship status with others or provide notifications to stay in contact with specific people that the individual intermittently interacts with based on their relationship status.

An example social relationship identification system may be utilized by law enforcement agencies to identify connections between people based on image recognition for identities (e.g., facial recognition) and common activities or participation in illegal activities, and thereby assist law enforcement agencies with mitigating crime and terror. For example, a surveillance recording of a flash-mob robbing a store may be analyzed to identify individuals who participated in the robbery, identification of items that were taken from the store, and to potentially determine a group affiliation between the participants based on other image analysis (e.g., social networking posts, or street level surveillance images or video).

Figure 1:
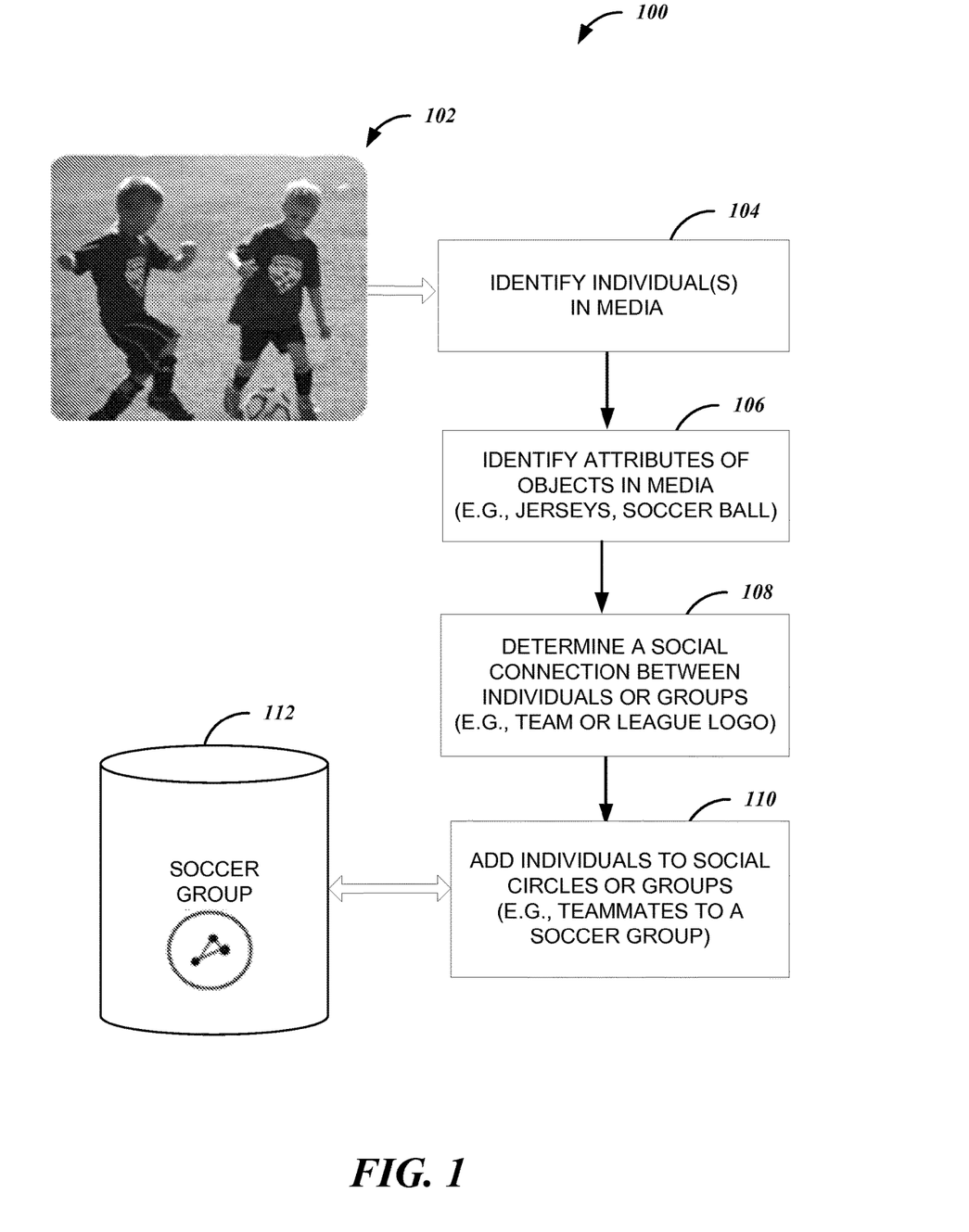
FIG. 1 is a flow diagram illustrating an example of a social circle identification scheme, according to an embodiment.

FIG. 1 is a flow diagram illustrating an example of a social circle identification scheme 100, according to an embodiment. The identification of attributes in one or more images may imply or suggest trusted relationships between people or ascription to different social groups. An image 102, or other media, may be analyzed to extract artifacts to derive trusted relationships between people and ascriptions to different groups. At 104, a social circle identification system may receive the image 102 and identify one or more individuals depicted in the media. For example, image analysis techniques and machine learning capabilities (e.g., facial recognition processes) may provide for the identification of individuals depicted in image 102 based on previously analyzed media, or new identities may be created for later identification confirmation or association with known individuals.

At 106, the attributes of objects depicted in image 102 may be analyzed and identified. Object analysis may provide context to the scene depicted in image 102, such as logos, text, buildings, brands, locations, and the like that supplement the identities of the individuals depicted. In this manner an identified object may be utilized to create an additional layer of context about the scene depicted in the image 102. For example, the image 102 of two players playing soccer in matching outfits may suggest that both players are on the same soccer team, or at least in a common soccer league, and that the two players are potentially friends or acquaintances.

At 108, the extraction of attributes from object in images may be utilized to help identify people an individual works with, people the individual takes classes with, a spouse, a relative, or any other social connection, and also identify ascriptions to different groups. In this manner, scheme 100 may provide the individual with an understanding his or her social circles of any kind. In an example, only minimal information from the individual's background or history may be utilized to construct a social circle, and in some examples or scenarios it may not be necessary for a user to manually or voluntarily provide any personal or contextual information.

An automatic mechanism for defining attributes or grouping individuals, and learning about connection with others, may be provided which may be used across multiple applications. In an example, a picture of two individuals kissing may imply a romantic or familial relationship between the individuals, and in another case an individual in a picture next to a corporate building may imply, along with additional context, that that the individual is an employee, customer, or visitor of the corporation.

At 110, any identified or potential connections or social relationships with other individuals may be added to a social circle or group for storage in a database 112, in a fully automatic manner. The scheme 100 may thereby create a representation of individual connections and group ascriptions based on provided or acquired photos or videos, which may be leveraged for a variety of applications.

Figure 2:
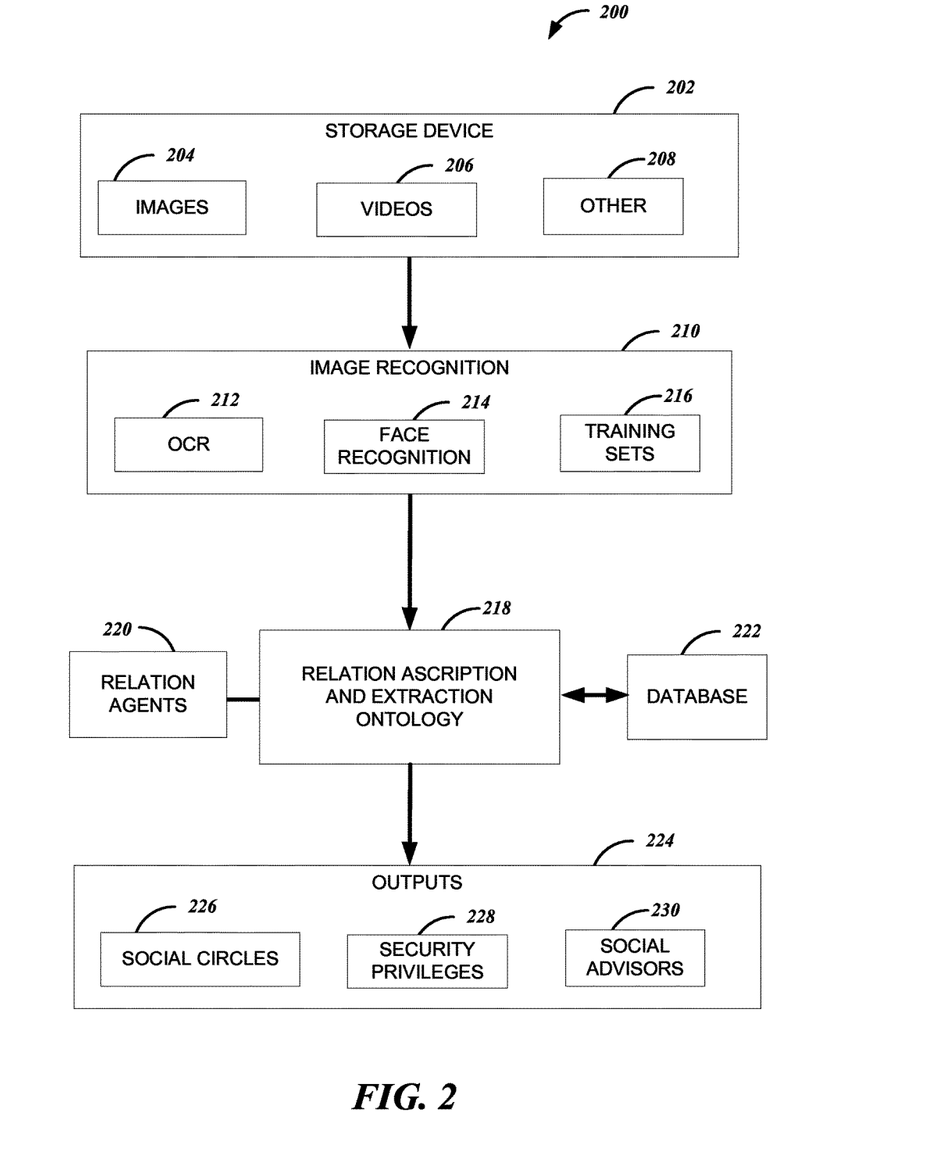
FIG. 2 is a block diagram illustrating an example of a relationship identification system, according to an embodiment.

FIG. 2 is a block diagram illustrating an example of a relationship identification system 200, according to an embodiment. The system 200 may include a storage device 202 that includes images 204, videos 206 or other media 208. The storage device 202 may be a singular device such as a hard disk drive, a flash drive, or other tangible computer readable medium, or a plurality of devices connected to the system 200, e.g., a disk drive array, a cluster of network storage devices, or a cloud-based storage service.

The content of the storage device 202 may be provided to an image recognition module 210. The image recognition module may be a single component adapted to perform image analysis, or a plurality of separate components that each may be utilized to perform a specialized analysis. For example, the image recognition module 210 may include optical character recognition (OCR) 212 that may be used to identify text in media to assist with extracting or determining any depicted relationship or ascription, such as the name of the soccer group that an individual may be part of. The image recognition module 210 may include a facial recognition module 214 to determine or match identities of individuals depicted in media provided by the storage device 202. Face detection and recognition may be implemented as a subset of the attributes that may be extracted by the image processing module 210.

A variety of different attributes of the photo may be identified by image recognition module 210 such as: what someone is wearing, where an individual is located, what the individual is doing, or who the individual is with, or other who-what-when-where type characteristics. An example technique of identifying this type of contextual information may utilize machine learning capabilities that are included in a module of training sets 216. For example, sample images may be processed and unique patterns extracted, in order to train the system 200 to recognize similar attributes in new or unknown images.

A relation ascription and extraction ontology 218 may be utilized after identifying the people in an image and the different attributes mentioned above, then relations may be extracted using a predefined ontology. The relevant relation may be created and stored in a database 222 coupled to the relation ascription and extraction ontology 218. These relations may be probabilistic, and may include a confidence level for each relation. For example, the analysis of a certain amount or threshold number of images supporting a hypothesis of a relation may provide a level of certainty which would suggest a real relationship or ascription to a group of some sort, such as if the system 200 has analyzed three different pictures of two people kissing the system 200 may estimate with a strong degree of certainty that the two people are in a relationship. However, if the system 200 only has analyzed one picture of one person kissing another person on the cheek there would only have a partial certainty that would fall below the threshold for confirming a relationship.

Other social or relation agents 220 may be coupled to the relation ascription and extraction ontology 218. For example, if a user allows his ascriptions and relationships to be shared with other users and social agents, this information may be combined with the context derived from the image analysis to contribute to the confidence level of different ascriptions and relationships that may otherwise fall below a confirming threshold. In an example scenario, the system 200 may analyze John's image and recognize a soccer uniform, and that John is a friend of Brian, who is noted to be in a soccer group and uses the same social service, this may strengthen the hypothesis formed by the system 200 that John is in a soccer group.

The system may provide a variety of outputs 224 based on the image analysis and social relation ascription and extraction ontology 218 processing. For example, social circles 226 may be generated that include members with common interests, relationships or characteristics. In an example, security privileges 228 may be provided based on the identity and relationships between individuals. For example, an electronic lock may be opened by the system 200 in response to determining that a child of a user is present at the front door of the user's home. Additionally, social advisors 230 may provide social suggestions to facilitate social interactions with others. For example, the social advisor 230 may provide advice on a relationship status, such as a reminder to contact a close friend after a long period of silence, or to recommend an activity or topic that two individuals may share an interest in (e.g., sports, art, children, consumer brands, employment, technology, etc.) based on the analysis of the two individuals corresponding activities.

Figure 3:
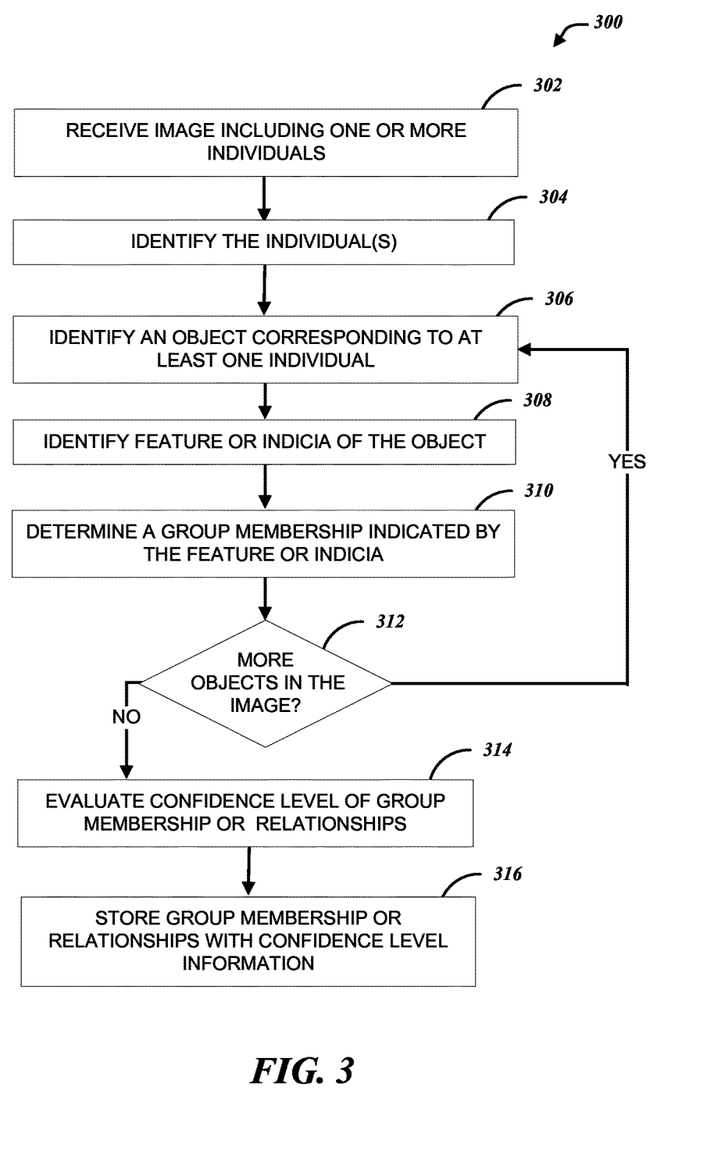
FIG. 3 is a flow diagram illustrating an example scheme for social relationship identification, according to an embodiment.

FIG. 3 is a flow diagram illustrating an example scheme 300 for social relationship identification, according to an embodiment. The scheme 300 may be implemented, for example, by the system 200 of FIG. 2.

At 302, a system or device may receive an image including one or more individuals. The image may include a photograph or a frame from a video. The image may be stored locally on the system or device, obtained by the device, e.g., with a camera or digital video recorder, or accessed through a connection to a second device or server on a network.

At 304, an image analysis technique may identify the one or more individuals. The image analysis may include facial recognition or other techniques to determine an identity for the one or more individuals. The analysis may also include an activity evaluation of the individuals. For example, is/are individual(s) running, biking, walking, sitting, standing in a group, touching, watching something, or any other activity.

At 306, an image analysis technique may identify an object corresponding to at least one individual. For example, an object identification technique (e.g., machine vision) may be utilized to determine what objects (e.g., buildings, cars, furniture, sports equipment, merchandise, clothing etc.) are present in the image.

At 308, an image analysis technique may identify a feature or indicia of the object. For example, if an individual wearing an article of clothing with lettering or a logo the lettering or logo may be analyzed to determine the content of the lettering (e.g., OCR) or the identity of the logo (e.g., a team, school, or company symbol or emblem). In a more specific example, a group of people depicted in an image as wearing a similar or identical uniform that include a particular indicia or markings may be determined as all being employees of an organization indicated by the indicia or markings (e.g., a group of police officers wearing uniforms and badges, or a team of manufacturing workers dressed in work clothes or safety equipment bearing a logo of a manufacturing corporation).

At 310, the system or device may determine a group membership indicated by the feature or indicia. The group membership may include a relationship between two individuals. For example, two individuals who are depicted in matching softball jerseys with a company logo may be determined to be members of a company softball team, and an further determination may be suggested that both individuals are employees or patrons of the company associated with the logo.

At 312, a check may be made to determine if more objects are present in the image. For example, the identification of a softball jersey at 306 and 308 may suggest that the image be analyzed for softball or baseball equipment, or other athletic equipment, or stadium features to provide further context as to whether the individuals are participants in the sporting event or fans at a spectator venue.

At 314, the device or system may evaluate the confidence level of the relationships. The confidence level may be adjusted as multiple images with common individual(s) are processed. At 316, the device or system may store the relationships in a database along with the confidence level information.

Figure 4:
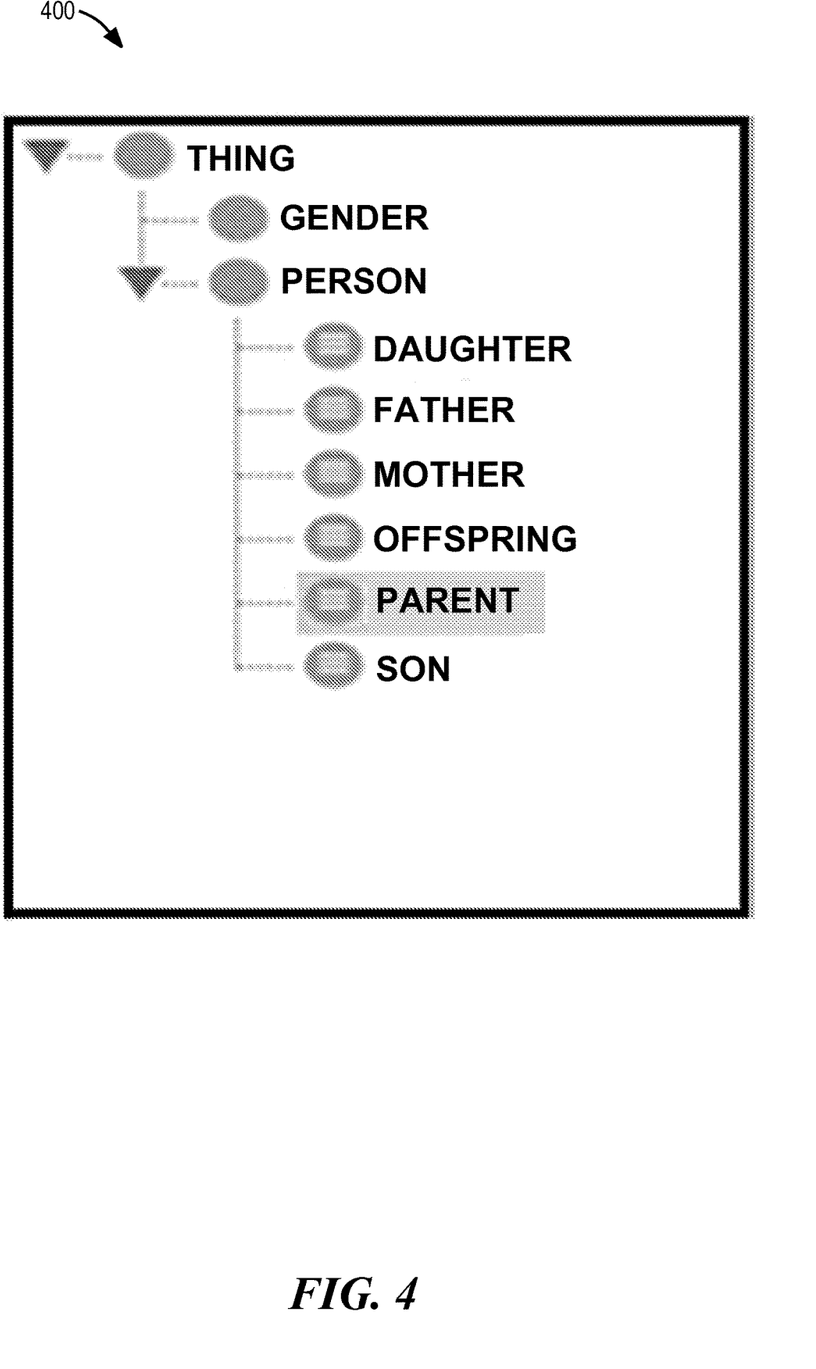
FIG. 4 is an example of a hierarchical predefined ontology, according to an embodiment.

FIG. 4 is an example of a hierarchical predefined ontology 400, according to an embodiment. The identifying characteristics and relationships extracted from a photo may be assigned to entries in a hierarchical predefined ontology 400, depicting the possible groups one could be associated with, the different relationship types one may be in, or other characteristics. For example, ontology 400 depicts a small subset of a predefined family ontology as an example of the possible relations may be predefined. Additional ontologies may include occupations, activities, hobbies, interests, and the like.

Figure 5:
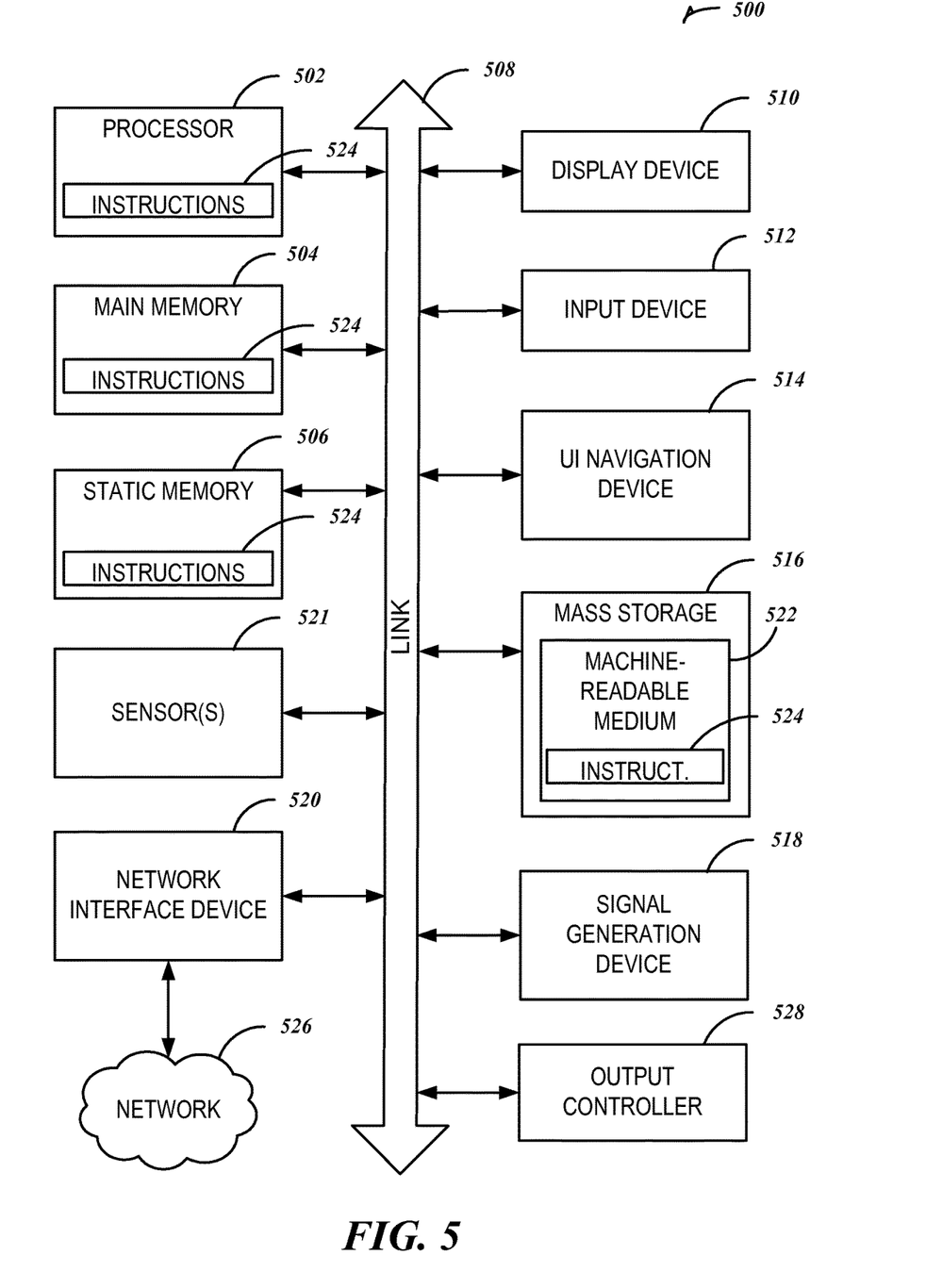
FIG. 5 is a block diagram illustrating an example machine upon which any one or more of the techniques discussed herein may be performed.

FIG. 5 is a block diagram illustrating an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules or components are tangible entities capable of performing specified operations and may be configured or arranged in a certain manner. In an example, circuits may be arranged (e.g., internally or with respect to external entities such as other circuits) in a specified manner as a module or component. In an example, the whole or part of one or more computer systems (e.g., a standalone, client or server computer system) or one or more hardware processors may be configured by firmware or software (e.g., instructions, an application portion, or an application) as a module/component that operates to perform specified operations. In an example, the software may reside (1) on a non-transitory machine-readable medium or (2) in a transmission signal. In an example, the software, when executed by the underlying hardware of the module/component, causes the hardware to perform the specified operations.

Accordingly, the terms "module" and "component" are understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules/components are temporarily configured, each of the modules/components need not be instantiated at any one moment in time. For example, where the modules/components comprise a general-purpose hardware processor configured using software, the general-purpose hardware processor may be configured as respective different modules/components at different times. Software may accordingly configure a hardware processor, for example, to constitute a particular module/component at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via a link 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524. The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
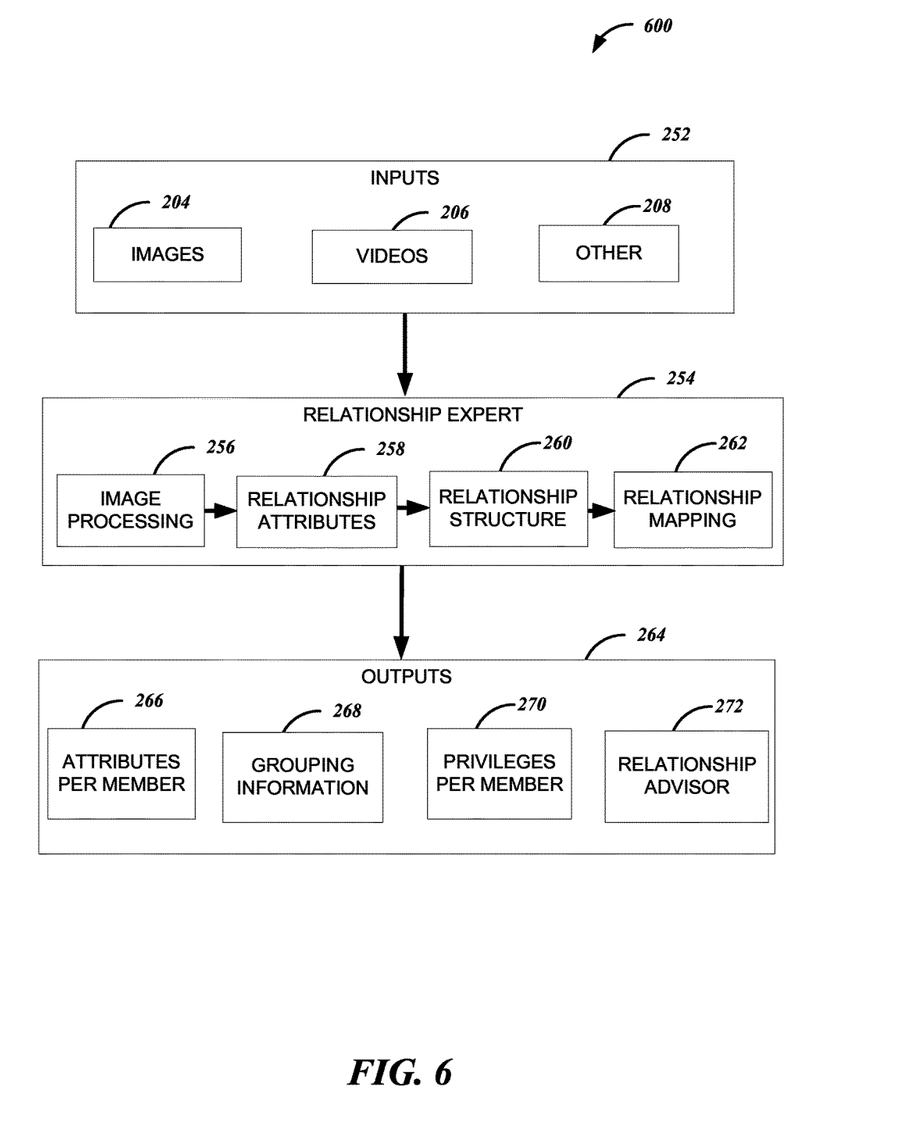
FIG. 6 is a block diagram illustrating an example of a relationship identification system, according to an embodiment.

FIG. 6 is a block diagram illustrating an example of a relationship identification system 600, according to an embodiment. The system 600 may receive inputs 252, such as images 204, videos 206, or other media 208 as discussed with respect to system 200 of FIG. 2. The inputs 252 may be provided by the system 600 to a relationship expert component 254.

The relationship expert component 254 may include multiple sub-components that provide an automated analysis of the inputs 252. For example, an image processing component 256 adapted to perform image analysis such as facial recognition of individuals, or optical character recognition (OCR) to identify text in the inputs 252. The results of the image processing component 256 may be provided to a relationship attributes component 258 in order to extract any depicted relationship indications. Relationship indications may include the proximity of individuals with respect to each other in an image (e.g., two individuals kissing may be an indication of a romantic relationship, two individuals hugging may be an indication of a familial relationship, and two individuals enjoying a meal together may suggest a friendship).

A relationship structure component 260 may receive the relationship indications from the relationship attributes component 258 and construct relationship structures between individuals or groups. In an example, relationship indications may be arranged in a predefined hierarchical ontology. For example, a threshold number of images with two individuals together may support an analysis of a single image, which may depict the two individuals kissing or in any more intimate setting, as confirming their friendship and increasing the likelihood that they are in a romantic relationship.

A relationship mapping component 262 may receive or analyze the relationship structures constructed by the relationship structure component 260 and generate social circles, or proposed relationship connections, with multiple individuals based on their common attributes or acquaintances in their respective relationship structures.

The system 600 may generate a variety of outputs 264 as a result of the analysis performed by the relationship expert component 254. The outputs 264 may include attributes per member 266, grouping information 268, privilege per member 270 and a relationship advisor component 272. In an example, the attributes per member 266 may include one or more characteristics determined by any one of the components of the system 600. Characteristics may include elements in an ontology, such as the hierarchical predefined ontology 400 depicted in FIG. 4. Grouping information 268 may include relationships between individuals, such as familial, romantic, friendships, business, or other types of relationships or connections.

VARIOUS NOTES & EXAMPLES

The following examples pertain to further embodiments. Specifics in the examples may be used anywhere in one or more embodiments.

Example 1 includes subject matter (such as an apparatus, a method, a means for performing acts, or a machine readable medium including instructions that, when performed by the machine, that cause the machine to perform acts), to determine social relationships, including: an apparatus comprising: an image recognition component implemented with the processor and memory, the image recognition component to: receive an image, the image including at least one individual; identify the at least one individual in the image; and identify an object corresponding to the at least one individual in the image, the object including an feature or indicia including an indication of membership in a group; and a relation ascription component to: determine a context for the social connection based at least in part on the object; and determine a social connection for the at least one individual to the group based at least in part on the feature or indicia associated with the group.

In Example 2, the subject matter of Example 1 may optionally include, wherein image recognition component is to: perform optical character recognition of the indicia to determine an identity of the group.

In Example 3 the subject matter of any one or more of Examples 1 to 2 may optionally include: a camera coupled to the image recognition component, the camera adapted to provide the image to the image recognition component.

In Example 4 the subject matter of any one or more of Examples 1 to 3 may optionally include, wherein image recognition component is further arranged to: perform facial recognition of all individuals depicted in the image.

In Example 5 the subject matter of any one or more of Examples 1 to 4 may optionally include: a data store coupled to the relation ascription component, the data store adapted to store the social connection of the at least one individual to the group in a database including a plurality of social circles for the at least one individual.

In Example 6 the subject matter of any one or more of Examples 1 to 5 may optionally include, wherein the relation ascription component is to: calculate a confidence level associated with the social connection, and in response to the confidence level being above a threshold, classifying the social connection as a specific relationship.

Example 7 includes subject matter (such as an apparatus, a method, a means for performing acts, or a machine readable medium including instructions that, when performed by the machine, that cause the machine to perform acts), to: receive an image, the image including at least one individual; identify the at least one individual in the image; identify an object corresponding to the at least one individual in the image, the object including an feature or indicia including an indication of membership in a group; and determine a social connection for the at least one individual to the group based at least in part on the feature or indicia associated with the group.

In Example 8, the subject matter of Example 7 may optionally include, instructions that when executed by the computing device cause the computing device to: perform optical character recognition of the indicia to determine an identity of the group.

In Example 9 the subject matter of any one or more of Examples 7 to 8 may optionally include, instructions that when executed by the computing device cause the computing device to: perform facial recognition of all individuals depicted in the image.

In Example 10 the subject matter of any one or more of Examples 7 to 9 may optionally include, instructions that when executed by the computing device cause the computing device to: determine a context for the social connection based at least in part on the object; wherein the context includes an association with the group.

In Example 11 the subject matter of any one or more of Examples 7 to 10 may optionally include, instructions that when executed by the computing device cause the computing device to: store the social connection of the at least one individual to the group in a database including a plurality of social circles for the at least one individual.

In Example 12 the subject matter of any one or more of Examples 7 to 11 may optionally include, instructions that when executed by the computing device cause the computing device to: create a representation of a plurality of social connections for the at least one individuals based on an analysis of a plurality of images.

In Example 13 the subject matter of any one or more of Examples 7 to 12 may optionally include, instructions that when executed by the computing device cause the computing device to: calculate a confidence level associated with the social connection, and in response to the confidence level being above a threshold, classifying the social connection as a specific relationship.

In Example 14 the subject matter of any one or more of Examples 7 to 13 may optionally include, wherein the specific relationship is at least one of: spousal, parent-child, co-worker, classmate, teammate, or friendship.

Example 15 includes subject matter for social relationship identification (such as a method, means for performing acts, machine readable medium including instructions that when performed by a machine cause the machine to performs acts, or an apparatus configured to perform) comprising: receiving an image, the image including at least one individual; identifying the at least one individual in the image; identifying an object corresponding to the at least one individual in the image, the object including an feature or indicia associated with a group; and determining a social connection for the at least one individual to the group based at least in part on the feature or indicia associated with the group.

In Example 16, the subject matter of Example 15 may optionally include, performing optical character recognition of the indicia to determine the group.

In Example 17 the subject matter of any one or more of Examples 15 to 16 may optionally include, performing facial recognition of all individuals depicted in the image.

In Example 18 the subject matter of any one or more of Examples 15 to 17 may optionally include, determining a context for the social connection based at least in part on the object; wherein the context includes an association with the group.

In Example 19 the subject matter of any one or more of Examples 15 to 18 may optionally include, storing the social connection of the at least one individual to the group in a database including a plurality of social circles for the at least one individual.

In Example 20 the subject matter of any one or more of Examples 15 to 19 may optionally include, creating a representation of a plurality of social connections for the at least one individuals based on an analysis of a plurality of images.

In Example 21 the subject matter of any one or more of Examples 15 to 20 may optionally include, calculating a confidence level associated with the social connection, and in response to the confidence level being above a threshold, classifying the social connection as a specific relationship.

Example 22 includes a machine-readable medium including instructions that when performed by a machine cause the machine to perform any one of the examples of 15-21.

Example 23 includes subject matter for providing a social relationship identification means for performing any one of the examples of 1-22.

Example 24 includes subject matter (such as a device, apparatus, or machine) comprising a system to provide social relationship identification, comprising: a device to capture an image; an image analysis module to perform facial recognition to identify one or more individuals in the image and to perform optical character recognition of symbols on an object in the image; a relation ascription module to determine a relationship between the object and a social group, and suggest a social relationship between an individual in the image and the social group based at least in part on the object and the relationship between the object and the social group; and a relation agent coupled to a network and adapted to receive relationship information from an external source, the relationship information including contextual information associated with the one or more individuals identified in the image.

In Example 25, the subject matter of Example 24 may optionally include, wherein the external source is a publicly accessible social network.

In Example 26, the subject matter of Example 24 may optionally include, wherein the external source is a private social network.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A social-networking apparatus, comprising:
   computing hardware including a processor device and memory, the computing hardware to determine social relationships to be represented as social-networking connections, the computing hardware further comprising:
   an image recognition component to:
   receive an image, the image including at least one individual;
   identify the at least one individual in the image; and
   identify an object corresponding to the at least one individual in the image, the object including a feature or indicia including an indication of membership in a group; and
   a relation ascription component to:
   determine a context for the social connection based at least in part on the object; and
   determine a social-networking connection for the at least one individual to at least one other member of the group based at least in part on the feature or indicia associated with the group.

2. The apparatus of claim 1, wherein image recognition component is to:
   perform optical character recognition of the indicia to determine an identity of the group.

3. The apparatus of claim 1, further comprising:
   a camera coupled to the image recognition component, the camera adapted to provide the image to the image recognition component.

4. The apparatus of claim 1, wherein image recognition component is further arranged to:
   perform facial recognition of all individuals depicted in the image.

5. The apparatus of claim 1, further comprising:
a data store coupled to the relation ascription component, the data store adapted to store the social-networking connection of the at least one individual to the group in a database including a plurality of social circles for the at least one individual.

6. The apparatus of claim 1, wherein the relation ascription component is to:
calculate a confidence level associated with the social-networking connection, and in response to the confidence level being above a threshold, classifying the social-networking connection as a specific relationship.

7. At least one non-transitory machine readable storage medium comprising a plurality of instructions that when executed by a computing device configured as a system for determining social relationships to be represented as social-networking connections, cause the computing device to:
receive an image, the image including at least one individual;
identify the at least one individual in the image;
identify an object corresponding to the at least one individual in the image, the object including an feature or indicia including an indication of membership in a group; and
determine a social-networking connection for the at least one individual to at least one other member of the group based at least in part on the feature or indicia associated with the group.

8. The at least one machine readable medium as recited in claim 7, further comprising instructions that when executed by the computing device cause the computing device to:
perform optical character recognition of the indicia to determine an identity of the group.

9. The at least one machine readable medium as recited in claim 7, further comprising instructions that when executed by the computing device cause the computing device to:
perform facial recognition of all individuals depicted in the image.

10. The at least one machine readable medium as recited in claim 7, further comprising instructions that when executed by the computing device cause the computing device to:
determine a context for the social-networking connection based at least in part on the object;
wherein the context includes an association with the group.

11. The at least one machine readable medium as recited in claim 7, further comprising instructions that when executed by the computing device cause the computing device to:
store the social-networking connection of the at least one individual to the group in a database including a plurality of social circles for the at least one individual.

12. The at least one machine readable medium as recited in claim 7, further comprising instructions that when executed by the computing device cause the computing device to:
create a representation of a plurality of social-networking connections for the at least one individuals based on an analysis of a plurality of images.

13. The at least one machine readable medium as recited in claim 7, further comprising instructions that when executed by the computing device cause the computing device to:
calculate a confidence level associated with the social-networking connection, and in response to the confidence level being above a threshold, classifying the social-networking connection as a specific relationship.

14. The at least one machine readable medium as recited in claim 7, wherein the specific relationship is at least one of: spousal, parent-child, co-worker, classmate, teammate, or friendship.

15. A method of social relationship identification to be represented as social-networking connections, the method comprising:
receiving an image, the image including at least one individual;
identifying the at least one individual in the image;
identifying an object corresponding to the at least one individual in the image, the object including an feature or indicia associated with a group; and
determining a social-networking connection for the at least one individual to at least one other member of the group based at least in part on the feature or indicia associated with the group.

16. The method of claim 15, further comprising:
performing optical character recognition of the indicia to determine the group.

17. The method of claim 15, further comprising:
performing facial recognition of all individuals depicted in the image.

18. The method of claim 15, further comprising:
determining a context for the social-networking connection based at least in part on the object;
wherein the context includes an association with the group.

19. The method of claim 15, further comprising:
storing the social-networking connection of the at least one individual to the group in a database including a plurality of social circles for the at least one individual.

20. The method of claim 15, further comprising:
creating a representation of a plurality of social-networking connections for the at least one individuals based on an analysis of a plurality of images.

21. The method of claim 15, further comprising:
calculating a confidence level associated with the social-networking connection, and in response to the confidence level being above a threshold, classifying the social-networking connection as a specific relationship.

22. A social relationship identification system comprising:
a device to capture an image;
an image analysis module to perform facial recognition to identify one or more individuals in the image and to perform optical character recognition of symbols on an object in the image;
a relation ascription module to determine a relationship between the object and a social group, and suggest a social relationship between an individual in the image and the social group based at least in part on the object and the relationship between the object and the social group; and
a relation agent coupled to a network and adapted to receive relationship information from an external source, the relationship information including contextual information associated with the one or more individuals identified in the image.

23. The system of claim 22, wherein the external source is a social network.

* * * * *

UNITED STATES PATENT AND TRADEMARK OFFICE
CERTIFICATE OF CORRECTION

PATENT NO. : 9,928,447 B2
APPLICATION NO. : 15/025767
DATED : March 27, 2018
INVENTOR(S) : Koren et al.

Page 1 of 1

It is certified that error appears in the above-identified patent and that said Letters Patent is hereby corrected as shown below:

On the Title Page

Item (72), in "Inventors", in Column 1, Line 1, delete "Gani Tikva" and insert --Ganei Tikva-- therefor Signed and Sealed this
Ninth Day of July, 2019

Andrei Iancu
*Director of the United States Patent and Trademark Office*